United States Patent
Popp et al.

(10) Patent No.: US 7,247,127 B2
(45) Date of Patent: Jul. 24, 2007

(54) METHOD FOR INCREASING THE SPONTANEITY OF AN AUTOMATIC TRANSMISSION

(75) Inventors: Christian Popp, Kressbronn (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 247 days.

(21) Appl. No.: 10/527,872

(22) PCT Filed: Sep. 23, 2003

(86) PCT No.: PCT/EP03/10551

§ 371 (c)(1),
(2), (4) Date: Mar. 16, 2005

(87) PCT Pub. No.: WO2004/031619

PCT Pub. Date: Apr. 15, 2004

(65) Prior Publication Data

US 2006/0040786 A1    Feb. 23, 2006

(30) Foreign Application Priority Data

Sep. 27, 2002  (DE) ............................... 102 45 359

(51) Int. Cl.
*F16H 61/00* (2006.01)
(52) U.S. Cl. ...................................... 477/154; 477/121
(58) Field of Classification Search ................ 477/115, 477/121, 143, 154
See application file for complete search history.

(56) References Cited

U.S. PATENT DOCUMENTS

| | | | |
|---|---|---|---|
| 4,955,257 A * | 9/1990 | Terayama et al. ........... 477/154 |
| 5,285,880 A * | 2/1994 | Minagawa et al. ......... 192/3.58 |
| 5,505,100 A * | 4/1996 | Mitchell et al. .............. 74/335 |
| 5,609,068 A | 3/1997 | Gruhle et al. | |
| 5,941,795 A * | 8/1999 | Tsuchiya et al. ............ 477/148 |
| 6,102,830 A | 8/2000 | Tsutsui et al. | |
| 6,176,811 B1 | 1/2001 | Popp et al. | |
| 6,186,923 B1 | 2/2001 | Popp et al. | |
| 6,385,520 B1 | 5/2002 | Jain et al. | |
| 2002/0046617 A1 | 4/2002 | Inagawa et al. | |

FOREIGN PATENT DOCUMENTS

DE        42 40 621 A1    6/1994

(Continued)

*Primary Examiner*—Ha Ho
(74) *Attorney, Agent, or Firm*—Davis Bujold & Daniels, P.L.L.C.

(57) ABSTRACT

A method for shifting gears of a transmission of a vehicle, which, during a shift, a first shift element opens and a second shift element closes. To increase the spontaneity and reduce the shifting frequency a downshift from a first gear to a second gear is interrupted without delay and the first gear returned to when an interruption criterion is recognized. The interruption criterion is established when the driver upshifts before a current transmission input speed deviates from a synchronous speed of the first gear or before a time interval, which begins when the speed deviates from the synchronous speed of the first gear, has exceeded a predefined, time-related limit value or before the current transmission input speed has deviated from a synchronous speed of the first gear by a predefined, speed-related limit value or before a pressure of the first shift element falls below a pressure-related limit value.

20 Claims, 4 Drawing Sheets

FOREIGN PATENT DOCUMENTS

| | | |
|---|---|---|
| DE | 197 22 954 C1 | 6/1998 |
| DE | 197 14 853 A1 | 10/1998 |
| DE | 43 11 886 C2 | 12/2001 |
| EP | 0 341 631 A2 | 11/1989 |
| EP | 0 341 631 B1 | 3/1994 |
| EP | 0 800 022 A2 | 10/1997 |
| EP | 1 188 961 A2 | 3/2002 |
| EP | 0 800 022 B1 | 7/2002 |
| EP | 1 298 361 A2 | 4/2003 |
| WO | WO-98/45627 | 10/1998 |

\* cited by examiner

Fig. 1

| Clutch - Logic | | | | | | | | |
|---|---|---|---|---|---|---|---|---|
| POS/GEAR | Shift Element | | | | | | | Idler |
|  | A | B | C | D | E | F | G | FL1 |
| R = R-Gear |  | * |  | * |  |  | * |  |
| N = Neutral |  |  |  |  |  | * | * |  |
| D, 1. Gear | * |  |  |  |  |  | * | * |
| D, 2. Gear | * |  | * |  |  |  | * |  |
| D, 3. Gear | * |  | * |  |  | * |  |  |
| D, 4. Gear | * |  |  |  | * | * |  |  |
| D, 5. Gear |  |  | * |  | * | * |  |  |
| 1, 1. Gear | * |  |  | * |  |  | * | * |

\* = Active

METHOD FOR INCREASING THE SPONTANEITY OF AN AUTOMATIC TRANSMISSION

This application is a national stage completion of PCT/EP2003/010551 filed Sep. 23, 2003 which claims priority from German Application Serial No. 102 45 359.4 filed Sep. 27, 2002.

FIELD OF THE INVENTION

The invention concerns a method for carrying out gearshifts of an automatic transmission in a motor vehicle by way of an increased spontaneity of the automatic transmission and a shifting frequency is reduced.

BACKGROUND OF THE INVENTION

Gear shifts in an automatic transmission of a motor vehicle are usually initiated when a desired performance is called for by the vehicle's driver, for example, by acting on an accelerator pedal or throttle valve setting, exceeds an upshift or downshift characteristic of a shifting performance field of the automatic transmission. Besides these shifts initiated by way of the accelerator pedal, the driver can also initiate gear shifts manually at any time. Thus for example, DE 43 11 886 C2 shows a device which a driver can initiate gear shifts using a selector lever with a manual gate or switch-lever on the steering wheel.

In this, the gear shifts of the automatic transmission can for example be carried out as overlap shifts in which a first shift element opens and a second shift element closes. The pressure variation of the respective shift elements involved in the gear shift is usually controlled or regulated by an electronic transmission control unit, which acts upon a hydraulic shift element control system via electromagnetic control elements. Such a control method is known from DE 42 40 621 A1.

In practice, the following problem can now occur at the beginning of an intended overtaking process; the driver uses the accelerator pedal to call for a downshift which is then initiated by the transmission control unit. During the overtaking process just started, the driver then realizes that he must give way to oncoming traffic. As a reaction to this he interrupts the overtaking process by releasing the accelerator pedal. As a rule, this release of the pedal causes the transmission control to carry out an upshift. At a later time, still during the upshift, if the driver now sees that the opposite lane is free, he then resumes the overtaking process either by again actuating the accelerator pedal or by initiating a downshift manually using the selector lever. According to the prior art, however, the automatic transmission will first carry out the downshift completely and then the upshift and only then can another downshift be started.

As an improvement, a method for controlling an overlap gear shift is known from EP 0 341 631 B1 in which a first gear shift process that has been started is not completed if, after the passage of a blocking time after the shift command for the first gear shift, a shift command for a second gear shift is given within a time during which the clutch to be released is still transmitting torque and the clutch to be engaged is not yet transmitting any torque. If a second shift command is given after that moment, i.e., at the end of the first and during the second phase of the overlap gear shift, the first gear shift that has been started is first completed, a further blocking time is allowed to pass and only then is the next gear shift carried out.

To further increase the spontaneity of an electro-hydraulically controlled automatic transmission, a method is known from DE 197 22 954 C1 for the control of overlap gear shifts that take place in three phases, in which an upshift from a first to a second gear is, on the one hand, carried out immediately and, on the other hand, interrupted without delay, before the beginning of the third phase of the overlap upshift in progress, if a driver-specific command for a downshift is recognized. In this, the first phase of the overlap gear shift is defined as the filling and control phase during which the shift element to be engaged is being filled with pressure medium and a speed increase of a transmission input speed is adjusted by a pressure reduction of the shift element being disengaged. The second phase corresponds to the load uptake by the shift element being engaged and begins with a reduction of the speed increase. In the third phase, which begins when the synchronization point of the first (old) gear is reached again, the shift element being engaged is closed completely and the transmission input speed is brought to the level of the synchronous speed of the second (new) gear.

From EP 0 800 022 B1, a method for controlling a gear shift process is known in which an upshift from a first to a second gear initiated by a first shift command is interrupted and the first gear returned to, when, during the closing phase of the upshift, in which a transmission input speed is changed from the synchronous speed of the first gear to the synchronous speed of the second gear by the shift pressure of the shift element being closed, a second shift command for a downshift is recognized. To those with knowledge of the field it is clear that this method can only be used properly in combination with automatically initiated free-running for automatic torque uptake during the return to the original first gear. Its use with an overlap gear shift, especially in the case of an upshift interruption at a late stage of the upshift closing phase, leads to considerable comfort problems (shift jerks) due to the clutch overlap.

Thus, on one hand, the problem is that there can be a large time lag between the driver's wish concerning the acceleration of the motor vehicle and the reaction of the automatic transmission, particularly in combination with overlap gear shifts, especially when a downshift-upshift-downshift sequence is called for. On the other hand, because of continual shifting, the shifting behavior of the automatic transmission can be perceived by the driver as hectic.

The purpose of the present invention is to further improve the spontaneity of a motor vehicle automatic transmission without adverse effect on the quality of shifting, in particular with overlap gear shifts and to reduce the shifting frequency of the automatic transmission perceptible by the driver.

According to the invention, this objective is achieved by the characteristics of claim 1 and by a method having the characteristics of the auxiliary claims 2, 4 or 6. Advantageous features of the invention emerge from the subordinate claims.

SUMMARY OF THE INVENTION

Accordingly, in a first approach according to the invention of the objective, a downshift of an automatic transmission in a motor vehicle from a first gear to a second gear is interrupted without delay and the first gear returned to when an interruption criterion is recognized. This interruption criterion exists when a call for a specific upshift by the driver of the motor vehicle is recognized before a transmission input speed or a speed equivalent thereto deviates from a synchronous speed of the first gear. Preferably, the downshift is designed as an overlap gear shift, but it can also be a free-running downshift.

Advantageously, by virtue of this method according to the invention, in the practical case described earlier the set sequence of downshift, possible blocking time and subsequent upshift is interrupted. Unnecessary shifts, for example a downshift from fifth to fourth gear, followed by an upshift from fourth to fifth gear, are suppressed. The behavior of the automatic transmission is more closely linked to the performance desired by the driver and the automatic transmission acts more spontaneously for the driver, but not too hectically.

In a second approach to the objective according to the invention, a downshift of a motor vehicle's automatic transmission from a first to a second gear is interrupted without delay and the first gear returned to, when an interruption criterion is recognized; this interruption criterion is recognized when a call for an upshift that can be specified by the motor vehicle's driver exists, before a current transmission input speed or a speed equivalent thereto has deviated from a synchronous speed of the first gear by a predefined, speed-related limit value. Here too, the downshift is preferably designed as an overlap gear shift, but can also be a free-running downshift.

By virtue of the applicable speed-related limit valve, it is ensured that at the time of the shift interruption, the driver does not yet perceive the downshift already started by the shifting sequence as an actual gear shift. The advantages of the second approach according to the invention are essentially the same as those of the first approach, but in the second approach the shift interruption in the shifting sequence can take place a little later than in the first solution. An interruption of the downshift can then no longer take place when a reaction perceptible by a driver, for example, a change of the vehicle's acceleration, takes place.

In a third approach to the objective according to the invention, a downshift of a motor vehicle's automatic transmission, again preferably designed as an overlap gear shift from a first to a second gear, is interrupted without delay and the first gear returned to, when an interruption criterion is recognized, this interruption criterion existing when a call for an upshift specified by the motor vehicle's driver is recognized before a time interval, which starts when a current transmission input speed or a speed equivalent thereto deviates from a synchronous speed of the first gear, has exceeded a predetermined, time-related limit value. Instead of an overlap gear shift, the downshift can also be designed as a free-running shift.

Finally, in a fourth approach to the objective according to the invention, a downshift of a motor vehicle's automatic transmission, preferably again designed as an overlap gear shift from a first to a second gear, is interrupted without delay and the first gear returned to, when an interruption criterion is recognized, which consists in the recognition of a call specified by the motor vehicle's driver for an upshift before a pressure of a shift element being disengaged for the downshift has fallen below a predefined, pressure-related limit value. In this approach according to the invention as well, the downshift can be designed as a free-running downshift instead of an overlap gear shift.

By virtue of the applicable time-related or pressure-related limit value, respectively in the third or fourth approaches, it is ensured that, at the time of the shift interruption, the driver hardly or at most only just perceives the downshift already started by the shifting sequence as an actual gear shift. Compared with the first and second solutions, the minimal interference with comfort and this only in extreme cases, enables the shift interruption to take place even later, if needs be.

In one embodiment of the invention, it is proposed to specify the speed-related and/or time-related and/or pressure-related limit value as a function of current operating parameters of the automatic transmission, in particular as a function of a current torque of a drive engine powering the automatic transmission and/or as a function of a desired performance or accelerator pedal angle set by the driver and/or as a function of a current speed or speed difference at the first or second shift element involved in the gear shift and/or as a function of a vehicle speed and/or as a function of a transmission temperature. Advantageously, in this way, the current environmental conditions of the downshift in progress are taken into account according to the situation in deciding whether a shift interruption is acceptable and this ensures the maximum shifting comfort.

In another embodiment of the invention it is proposed that when the interruption criterion is fulfilled, the pressure of the shift element to be disengaged for the downshift should be increased again in accordance with a predefined function to an engagement pressure level and, at the same time, a pressure of the shift element to be engaged for the downshift should be reduced in accordance with a predefined function, back down to a disengagement pressure level. In this, the engagement and disengagement pressure levels correspond respectively to an initial pressure level of the shift element in question in the first gear, before the downshift was initiated. The predefined function can for example be a time-controlled ramp function or even an abrupt pressure change.

In another embodiment of the invention, it is proposed that after a change from thrust to traction or from thrust to traction during the gear shift, the interruption criterion is only set after a time interval which starts at the same time as the thrust-traction change or the traction-thrust change. This version also contributes to the shifting comfort.

To simplify the shifting sequences within the electronic transmission control system, it is proposed that all the control sequences associated with the downshift first started in the time sequence, from the first to the second gear, in particular shift-specific blocking times and a shift-specific engine action, are transformed at the same time as the interruption criterion is set into corresponding control sequences associated with an upshift from the second gear to the first gear.

BRIEF DESCRIPTION OF THE DRAWINGS

The invention will now be described, by way of example, with reference to the accompanying drawings in which.

DETAILED DESCRIPTION OF THE INVENTION

Figure 1:
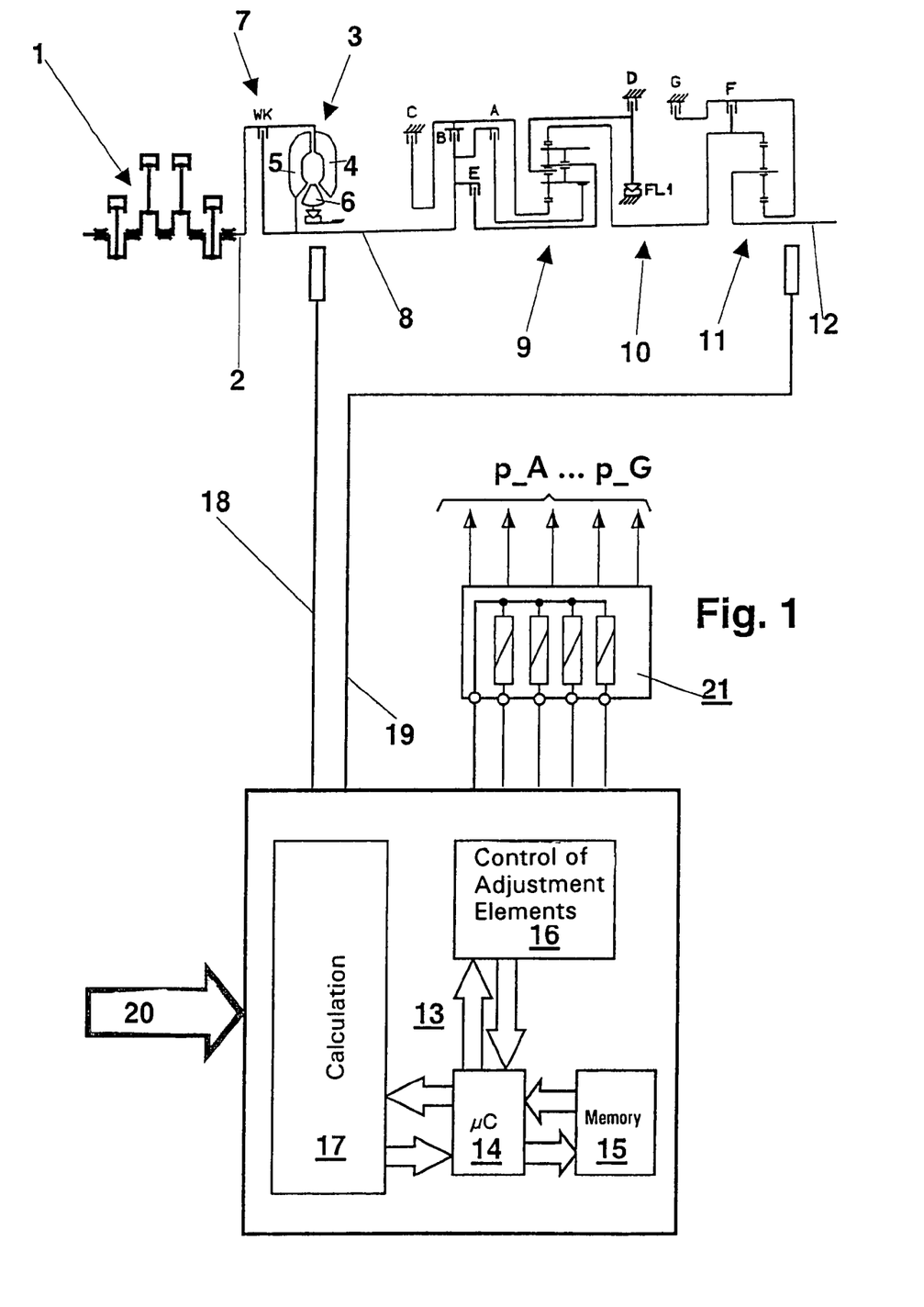
FIG. 1 is a system diagram of an automatic transmission.
Figure 2:
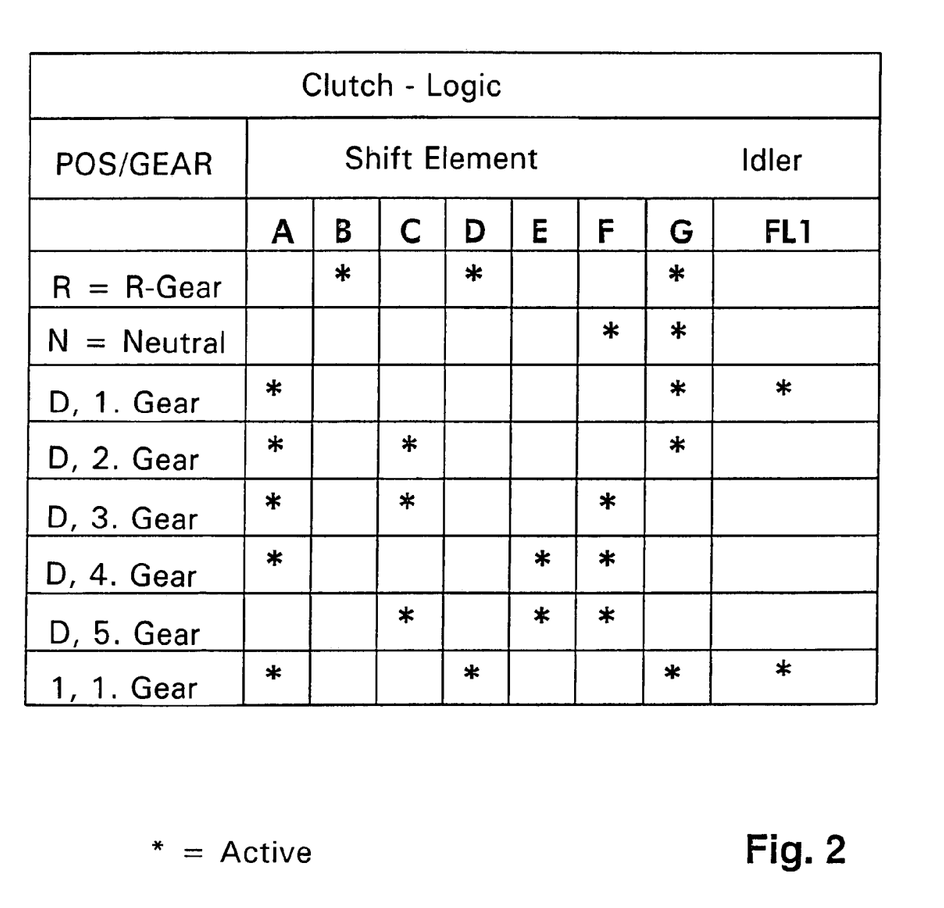
FIG. 2 is a table of the clutch logic of the automatic transmission according to FIG. 1.

FIG. 1 shows a system diagram of an example automatic transmission. This consists of the actual mechanical part, a hydrodynamic converter 3 as the starting element, a hydraulic control unit 21 and an electronic transmission control unit 13. The automatic transmission is powered by a drive engine 1, preferably an internal combustion engine, via a drive shaft 2. This is in rotationally fixed connection with a pump impeller 4 of the converter 3. In a known way, the hydrodynamic converter 3 consists of the pump impeller 4, a turbine rotor 5 and a guide wheel 6. A converter clutch 7 is arranged in the force flow parallel to the hydrodynamic converter 3. The converter clutch 7 and the turbine rotor 5 lead to a turbine shaft 8. When the converter clutch 7 is actuated, the turbine shaft 8 rotates at the same speed as the drive shaft 2. The mechanical part of the automatic transmission consists of shift elements A to G in the form of clutches and brakes, an idler 10 (FL1), a Ravigneaux gear set 9 and a planetary gear set 11 arranged after the Ravigneaux gear set 9 in the force flow direction. The drive output of the automatic transmission takes place via a transmission output shaft 12. Preferably, this leads to a differential (not shown), which drives the drive wheels of a motor vehicle (not shown) via two axle half-shafts. A gear is engaged by an appropriate combination of closed shift elements. The association of the clutch logic with the gear steps of the automatic transmission illustrated in FIG. 1 can be seen from FIG. 2. For example, for a downshift from fourth to third gear the shift element C formed as a brake is closed and the shift element E, formed as a clutch is disengaged. As can also be seen from the table of FIG. 2, the gear shifts from second gear up to fifth gear are each designed as overlap gear shifts, such that one shift element always has to be closed and one other shift element opened. Since the mechanical part of the automatic transmission is not relevant, for the further understanding of the invention, no further attempt is made to describe it in detail.

The electronic transmission control unit 13 selects an appropriate gear as a function of input magnitudes 18 to 20, taking into account a position signal specified by the driver by way of a position selector device (not shown). Via the hydraulic control unit 21, in which there are electromagnetic control elements, the electronic transmission control unit 13 then actuates an appropriate clutch/brake combination. During the shift transfers, the electronic transmission control unit 13 determines the pressure variation (p_A to p_G) of the clutch or brake involved in the gear shift in question. The electronic transmission control unit 13 comprises a microcontroller 14, a memory 15, a "control of adjustment elements" functional block 16 and a "calculation" functional block 17. The transmission-relevant data are stored in the memory 15. Transmission-relevant data are, for example, programs, vehicle-specific characteristics and diagnosis data. Usually, the memory 15 is an EPROM, EEPROM or a buffered RAM. In the "calculation" functional block 17 the relevant data for a gear shift process are calculated. The "control of adjustment elements" functional block 16 serves to control the adjustment elements present in the hydraulic control unit 21. The input magnitudes 18 and 19 processed by the electronic transmission control unit 13 are transmission-internal signals. In the example illustrated, the input 18 is a rotation speed of the turbine shaft 8 and the input 19 is a rotation speed of the transmission output shaft 12. Clearly, other transmission-internal signals as well can be sent to the electronic transmission control unit 13, for example a transmission temperature. The input magnitude 20 also processed by the electronic transmission control unit 13 is a simplified representation of all the signals from the vehicle and its drive engine that are needed for controlling the gear shifts, in particular, a magnitude that represents a performance desired by the driver (for example, an accelerator pedal or throttle valve angle or a shift command issued manually via the position selector device), a magnitude that represents a torque produced by the drive engine 1 and an engine speed, but also for example an engine temperature. Usually, the engine-specific data are provided by an engine control system (not shown here).

Figure 3:
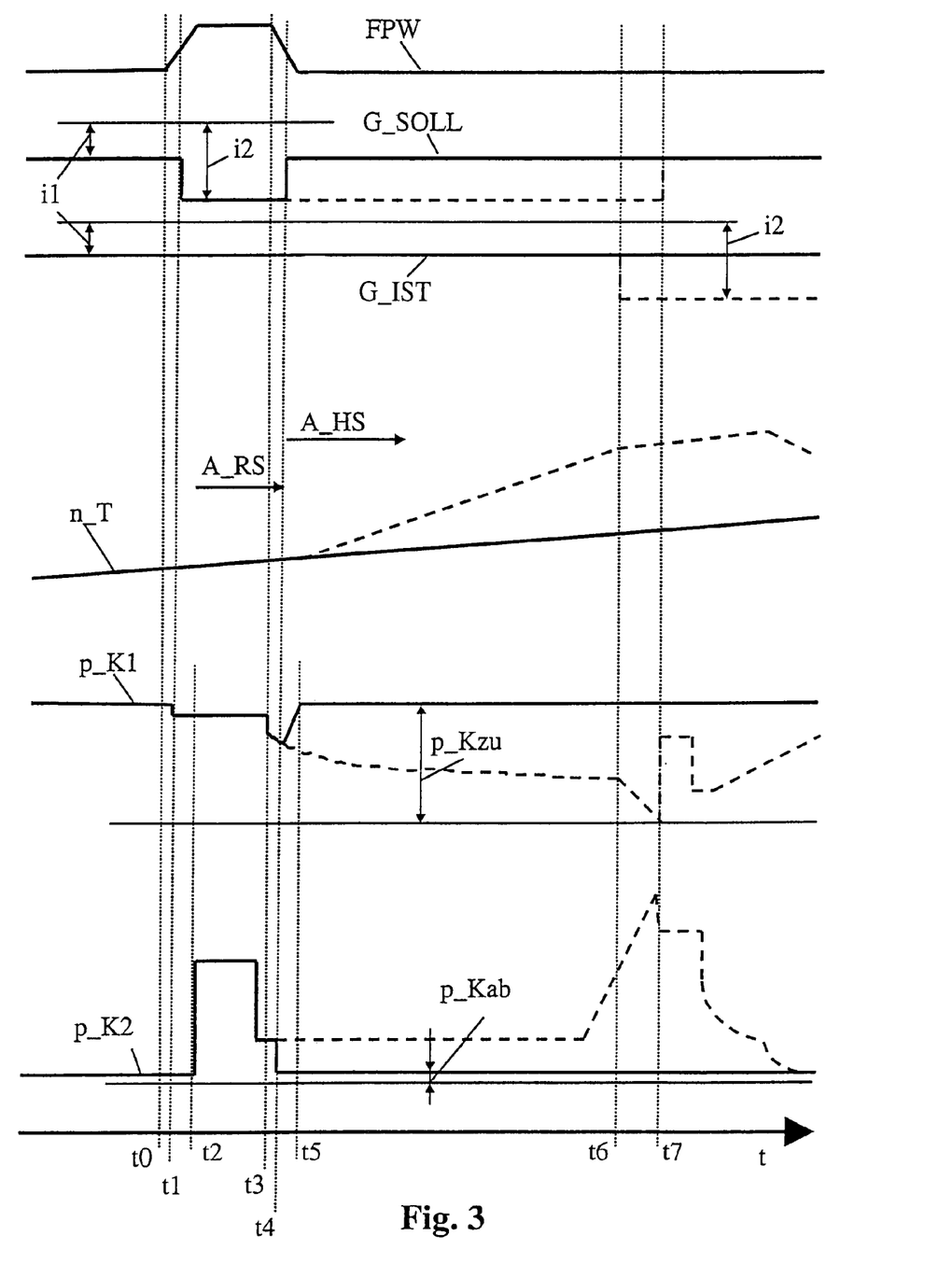
FIG. 3 is a first example shift sequence.
Figure 4:
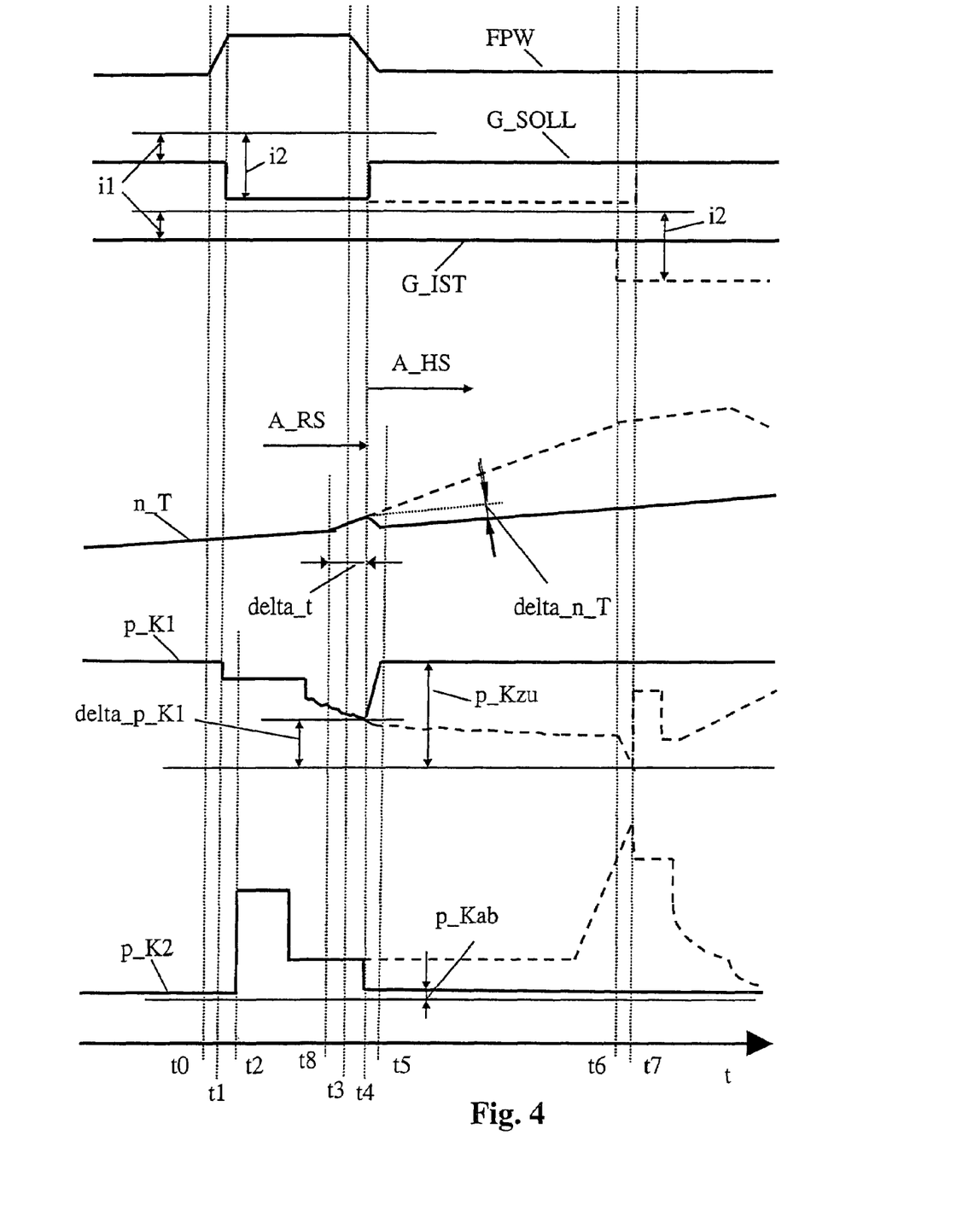
FIG. 4 is a second example shift sequence.

FIGS. 3 and 4 now show two examples of gear shift sequences of the automatic transmission according to FIG. 1. Thus, the gear shifts are, for example, designed as overlap shifts. The sequence is based on a typical driving situation, in which the driver begins an overtaking process and, therefore, initiates a downshift corresponding to his wish, but during the overtaking process he recognizes that he must give way to oncoming traffic and, accordingly, interrupts his overtaking process by releasing the accelerator pedal. It is assumed that, due to the return movement of the accelerator pedal, an upshift characteristic of the electronic transmission control unit 13 is exceeded, after previously falling below a downshift characteristic of the electronic transmission control unit 13 due to the pressing of the accelerator pedal. Thus, after a traction downshift, the automatic transmission begins a thrust upshift. To enable comparison of the shift sequences, in both Figures, according to the invention, the sequences are indicated with continuous lines and the corresponding sequences, according to the prior art, with broken lines.

FIG. 3 shows a first example gear shift sequence according to the invention. In the lower part of the Figure, a time axis t is indicated with discrete time points t0 to t7. Also shown are the time variations of an accelerator pedal angle FPW, a nominal gear indicator G_SOLL, an actual gear indicator G_IST, a transmission input speed n_T, a pressure p_K1 of a first shift element and a pressure p_K2 of a second shift element. Here, the accelerator pedal angle FPW represents, for example, the performance desired by the driver. The nominal gear indicator G_SOLL shows the status of an attempted gear shift, while the actual gear indicator G_IST characterizes the gear of the automatic transmission that is currently engaged. The first shift element is the clutch or brake that is opened for the downshift. The second shift element is, correspondingly, the clutch or brake that is closed for the downshift.

At a time t0, at which—as can be seen from the actual gear indicator G_IST—the automatic transmission is in a first gear i1, the driver actuates the accelerator pedal and thus increases the accelerator pedal angle FPW. As can be seen from the nominal gear indicator G_SOLL and, in correspondence with a shift characteristic line stored in the electronic transmission control unit, at a time t1 a downshift command to change from the first gear i1 to a second gear i2 is issued. In accordance with the accelerator pedal angle specification, the downshift called for is a traction downshift.

At the same time as the shift command at time t1, the pressure p_K1 of the first shift element which, according to the clutch logic of the downshift called for should be disengaged, is reduced in the usual way by a predefined amount. As can be seen from the time variation of the pressure p_K2, a short time later, at time t2, a rapid filling phase of the second shift element begins, this being the one which should be engaged in accordance with the clutch logic of the downshift called for.

Still before the previously requested downshift has ended and the actual gear indicator G_IST has changed to the value i2 of the new gear, at time t3 the driver then reduces the accelerator pedal angle FPW with the result that at a time t4, an upshift characteristic line stored in the electronic transmission control unit 13 is exceeded. Thus, at time t4 the nominal gear indicator G_SOLL changes back from i2 to the original first gear i1. According to the invention, the uncompleted traction downshift is immediately interrupted and all the shift sequences A_RS associated with the downshift originally called for are changed into corresponding shift sequences A_HS of a now immediately commencing thrust upshift back to the first gear i1, which was active before the downshift.

At the time t4 of the shift command to change back to the first gear i1, the (first) shift element that is to be disengaged is still torque-transmitting and the (second) shift element that is to be engaged is not yet in a torque-transmitting condition. This is made clear by the time variation of the transmission input speed n_T, which shows no speed reaction caused by an incipient overlap of the torque transmission of the two shift elements involved in the downshift.

As can be seen from the time variation of the pressure p_K2, the shifting pressure of the second shift element at time t4 is abruptly reduced to a disengagement pressure level p_Kab. Instead of this example pressure change, in another design version any applicable pressure reduction function can be provided, for example, a time-controlled and/or pressure-threshold-controlled pressure ramp. The disengagement pressure level p_Kab corresponds to the pressure level of the second shift element before the beginning of the downshift originally called for. Quantitatively, the disengagement pressure level p_Kab can, for example, be at least approximately "zero" but, alternatively, it could also be a pre-filling pressure to increase the reaction speed of this shift element when its closing is called for.

As can be seen from the time variation of the pressure p_K1, at time t4 a pressure ramp is started to increase the shifting pressure of the first shift element to an engagement pressure level p_Kzu. At time t5 the pressure p_K1 has reached this engagement pressure level p_Kzu. Here, the engagement pressure level p_Kzu corresponds to the pressure level of the first shift element before the beginning of the downshift originally called for which, in any case, depends on the torque of the drive engine. The pressure ramp can, for example, be specified as a function of rotation speed and/or a pressure threshold; the parameters of the pressure values preferably being applied with comfort in mind. Instead of the example pressure ramp, any applicable pressure increase function can be provided in another design version, for example, even an abrupt pressure jump.

From the time variation of the transmission input speed n_T, it can be seen clearly that the interruption of the overlap downshift in accordance with the invention entails no discomfort (no speed reaction).

The gain of spontaneity and the reduction in the gear shift frequency of the automatic transmission perceived by the driver, compared with the prior art, are also clearly evident. As shown by the shift sequences represented with broken lines and the corresponding rotation speed reaction during a comparable shift sequence according to the prior art, without the method according to the invention the overlap downshift originally called for would first be finished completely. According to the prior art, only after reaching the synchronous speed of the second gear i2 (at time t6), with the attainment of a locking pressure level of the second shift element, which is now the only torque-transmitting one (time t7), would the shift command to carry out a thrust upshift back to the first gear i1 be issued.

With reference to FIG. 4, according to the invention, a second example shift sequence will now be explained. As in FIG. 3, in the lower part of the Figure, a time axis t is indicated, this time with discrete time points t0 to t8. Also represented are the time variations of the accelerator pedal angle FPW, the nominal gear indicator G_SOLL, the actual gear indicator G_IST, the transmission input speed n_T and the pressures p_K1 and p_K2 of the first and second shift elements, respectively. Again, the first shift element is a clutch or brake that is opened for the downshift, while the second shift element is a clutch or brake that is closed for the downshift.

In contrast to the shift sequence represented in FIG. 3, in the shift sequence represented in FIG. 4 according to the invention, the downshift in progress is only interrupted at a time during the downshift when the transmission input speed n_T has already deviated by a small differential speed delta_n_T from the synchronous speed of the first gear i1 which was engaged before the downshift.

As can be seen in FIG. 4, at time t0, namely, when the driver actuates the accelerator pedal and so produces an increase of the accelerator pedal angle FPW, the automatic transmission is in the first gear i1. At time t1, the downshift command to change from the first gear to the second gear i2 is issued. In accordance with the accelerator pedal angle specified, the downshift requested is again a traction downshift, for example.

At the same time as the shift command at time t1 the pressure p_K1 of the first shift element is reduced by a predefined amount in the usual manner. A short time later, at time t2 the usual rapid filling phase of the second shift element begins; followed by a filling compensation phase (pressure variation p_K2) during which the clutch pressure p_K1 of the first shift element is reduced further (in a controlled manner).

At a time t8, the first shift element being disengaged can no longer transmit the full torque of the pull downshift with the result that the turbine rotation speed n_T deviates from the synchronous speed of the first gear i1 and begins increasing.

Still before the downshift previously called for has ended and the actual gear indicator G_IST has moved to the value i2 of the new gear, at time t3 the driver reduces the accelerator pedal angle FPW with the result that, at a time t4, an upshift characteristic line stored in the electronic transmission control unit is exceeded. Then, at time t4 the nominal gear indicator G_SOLL changes back from i2 to i1.

An essential feature of the invention for the downshift interruption (transformation of all the shift sequences A_RS associated with the downshift originally requested, into corresponding shift sequences A_HS for the now beginning upshift back to the first gear i1), which is still possible and, indeed, is initiated immediately at this time t4, is that either the speed difference delta_n_T of the transmission input speed n_T from the synchronous speed of the first gear i1 has not yet exceeded a predefined, speed-related limit value or a time difference delta_t, which begins when the transmission input speed n_T deviates from the synchronous speed of the first gear i1, has not yet exceeded a predefined, time-related limit value or that a current pressure delta_p_K1 of the first shift element being disengaged has not yet fallen below a predefined, pressure-related limit value.

In this respect, the values of the corresponding speed-, time- and pressure-related limit values are preferably chosen with shifting comfort in mind and are, therefore, predefined in such manner that a downshift interruption is no longer permitted when the driver can perceive the incipient torque transfer to the second shift element being engaged. Depending on the gear shift type and/or intensity called for by the change of the driver's wish (for example, the rate or size of the change of the accelerator pedal angle FPW), a certain loss of comfort can also be accepted, especially in the case of interrupted double or multiple downshifts and when the interruption takes place due to a rapid accelerator pedal return. Obviously, the speed-, time- and pressure-related limit values can be functionally linked with one another and can also be specified as a function of current operating parameters of the automatic transmission, for example as a function of a current drive engine torque and/or as a function of the driver's desired performance or the accelerator pedal angle he sets and/or as a function of a current speed or speed difference at the first or second shift element involved in the shift and/or as a function of a vehicle speed and/or as a function of a transmission temperature.

Similarly to the first shift sequence described with reference to FIG. 3, at the same time as the interruption of the downshift at time t4 the pressures p_K1 and p_K2 of the two shift elements begin changing back, respectively, to the engagement pressure level p_Kzu and to the disengagement pressure level p_Kab. During the course of these pressure changes, the transmission input speed n_T is restored to the synchronous speed of the first gear i1. In the example represented in FIG. 4, the change of the pressure p_K1 of the first shift element to the engagement pressure level p_Kzu (which, in any case, depends on the drive engine torque) takes place via a pressure ramp, while the change of the pressure p_K2 of the second shift element to the disengagement pressure level p_Kab is an abrupt change. In relation to possible designs of these pressure changes, reference can be made to the first shift sequence according to the invention described in detail earlier. Preferably, the pressure changes are applied in such manner that the driver perceives the decrease of the pressure difference delta_n_T present at the time of the interruption, which is completed by the moment t5, as at least not too uncomfortable so that the shift type and/or the intensity of the driver's wish change can be taken into account.

| Reference numerals | |
|---|---|
| 1 | drive engine |
| 2 | drive shaft |
| 3 | hydrodynamic converter |
| 4 | pump impeller of the hydrodynamic converter |
| 5 | turbine rotor of the hydrodynamic converter |
| 6 | guide wheel of the hydrodynamic converter |
| 7 | converter clutch |
| 8 | turbine shaft |
| 9 | Ravigneaux gear shift |
| 10 | idler FL1 |
| 11 | planetary gear shift |
| 12 | transmission output shaft |
| 13 | electronic transmission control unit |
| 14 | micro-controller |
| 15 | memory |
| 16 | functional block for adjustment element control |
| 17 | functional block for calculation |
| 18 | transmission-related input magnitude, turbine shaft rotation speed |
| 19 | transmission-related input magnitude, speed signal of the transmission output shaft |
| 20 | vehicle/drive engine-related input magnitude |
| 21 | hydraulic control unit |
| A . . . G | shift element, clutch or brake |
| p_A . . . p_G | pressure of the shift elements A to G |
| A_HS | shift sequence for an upshift |
| A_RS | shift sequence for a downshift |
| delta_n_T | rotation speed difference |
| delta_p_K1 | current pressure |
| delta_t | time difference |
| FPW | accelerator pedal angle |
| G_IST | actual gear indicator |
| G_SOLL | nominal gear indicator |
| i1 | first gear |
| i2 | second gear |
| n_T | transmission input speed, speed of the turbine shaft |
| p_K1 | pressure of a first shift element |
| p_K2 | pressure of a second shift element |
| p_Kab | disengagement pressure level of the second shift element |
| p_Kzu | engagement pressure level of the first shift element |
| t | time axis |
| t0 . . . t8 | discrete time points |

The invention claimed is:

1. A method for carrying out gear shifts for an automatic transmission of a motor vehicle the method comprising the steps of:
   disengaging, during a gear shift, a first shift element, which is one of a clutch or a brake and engaging a second shift element, which is one of a clutch or brake;
   interrupting a downshift from a first gear (i1) to a second gear (i2) without delay and engaging the first gear when an interruption criterion is recognized to increase spontaneity and reduce shifting frequency of the automatic transmission;
   establishing the interruption criterion when a driver of the motor vehicle has called for an upshift before a current transmission input speed (n_T) has deviated from a synchronous speed of the first gear (i1) by a predefined, speed-related limit value; and
   specifying the predefined, speed-related limit value as a function of an intensity of a change of a driver's wish, which is a function of one or more of a speed and a size of a change of an accelerator pedal angle (FPW).

2. The method according to claim 1, further comprising the step of only establishing the interruption criterion when a time interval, which begins when the current transmission input speed (n_T) deviates from the synchronous speed of the first gear (i1), has not yet exceeded at least one of a predefined, time-related limit value, and when a pressure (p_K1) of the first shift element being disengaged has fallen below a predefined, pressure-related limit value.

3. The method according to claim 2, further comprising the step of specifying one of the predefined time-related limit value or the predefined pressure-related limit value as a function of the intensity of the change of the driver's wish, which is the function of at least one of the speed and the size of the change of the accelerator pedal angle (FPW).

4. The method according to the preamble of claim 1, further comprising the step of establishing the interruption criterion if the driver of the motor vehicle has called for the upshift before a time interval, which begins when the current transmission input speed (n_T) deviates from the synchronous speed of the first gear (i1), has exceeded a predefined, time-related limit value, and the predefined time-related limit value being specified as the function of the intensity of the change of the driver's wish, as the function of one or more of the speed and the size of the change of the accelerator pedal angle (FPW).

5. The method according to claim 4, further comprising the step of only establishing the interruption criterion if the current transmission input speed (n_T) has not yet deviated from the synchronization speed of the first gear (i1) by at least one of the predefined, speed-related limit value, and when a pressure (p_K1) of the first shift element that is being disengaged has not yet fallen below a predefined, pressure-related limit value.

6. The method according to claim 5, further comprising the step of specifying one of the predefined speed-related limit value or the predefined pressure-related limit value as the function of the intensity of a change of the driver's wish, and as the function of at least one of the speed and the size of the change of the accelerator pedal angle (FPW).

7. The method according to claim 1, further comprising the step of establishing the interruption criterion if the driver of the motor vehicle has called for the upshift before a pressure (p_K1) of the first shift element being disengaged has fallen below a predefined, pressure-related limit value, and the predefined pressure-related limit value is specified as the function of the intensity of the change of the driver's wish, which is the function of at least one of the speed and the size of the change of the accelerator pedal angle (FPW).

8. The method according to claim 7, further comprising the step of only establishing the interruption criterion when a time interval, which begins when the current transmission input speed (n_T) deviates from the synchronous speed of the first gear (i1), has not yet exceeded one of a predefined, time-related limit value, and when the current transmission input speed (n_T) has not yet deviated from the synchronous speed of the first gear (i1) by the predefined, speed-related limit value.

9. The method according to claim 8, further comprising the step of specifying one of the predefined time-related limit value or the predefined speed-related limit value as a function of the intensity of the change of the driver's wish, which is the function of at least one the speed and the size of the change of the accelerator pedal angle (FPW).

10. The method according to claim 1, further comprising the step of specifying at least one of the predefined speed-related limit value, a predefined time-related limit value and a predefined pressure-related limit value are a function of current operating parameters of the automatic transmission, which are at least one of a function of a current torque of a drive engine (1) powering the automatic transmission, a function of one of a desired performance and the accelerator pedal angle (FPW) set by the driver, a function of one of a current speed and a speed difference at one of the first or the second shift element, and a function of a vehicle speed, and a function of a transmission temperature.

11. The method according to claim 1, further comprising the step of specifying at least one of the predefined speed-related limit value, a predefined time-related limit value, and a predefined pressure-related limit value as a function of a gear downshift.

12. The method according to claim 11, further comprising the step of defining at least one of:
the predefined speed-related limit value for an interruption of a multiple downshift as being larger than a predefined speed-related limit value for an interruption of a single downshift;
the predefined time-related limit value for the interruption of the multiple downshift as being larger than the time-related limit value is for the interruption of a single downshift; and
the pressure-related limit value for the interruption of the multiple downshift as being smaller than the pressure-related limit value is for the interruption of the single downshift.

13. The method according to claim 1, further comprising the step of at least one of defining, when one of the intensity of the change of the driver's wish is high, the predefined speed-related limit value as being higher than when the intensity of the change of the driver's wish is low,
defining, when the intensity of the change of the driver's wish is high, a predefined time-related limit value as being higher than when the intensity of the change of the driver's wish change is low, and
defining, when the change of the driver's wish is high, a predefined pressure-related limit value as being lower than when the intensity of the change of the driver's wish change is high.

14. The method according to claim 1, further comprising the step of, when the interruption criterion is fulfilled, increasing a pressure (p_K1) of the first shift element to an engagement pressure level (p_Kzu) in accordance with a predefined pressure-increase function, and, at the same time, reducing a pressure (p_K2) of the second shift element to a disengagement pressure level (p_Kab) in accordance with a predefined pressure-reduction function such that the engagement pressure level (p_Kzu) of the first shift element and the disengagement pressure level (p_Kab) of the second shift element correspond respectively to an initial pressure level of the first and the second shift elements in the first gear (i1) before beginning the downshift.

15. The method according to claim 14, further comprising the step of using a ramp function as at least one of the predefined pressure-increase function and the predefined pressure-reduction function.

16. The method according to claim 14, further comprising the step of using an abrupt pressure change as at least one of the predefined pressure increase function and the predefined pressure reduction function.

17. The method according to claim 14, further comprising the step of quantitatively setting the disengagement pressure level (p_Kab) of the second shift element to at least approximately zero.

18. The method according to claim 14, further comprising the step of using a pre-filling pressure of the second shift element as the disengagement pressure level (p_Kab) of the second shift element.

19. The method according to claim 1, further comprising the step of, when one of a change from thrust to traction or from traction to thrust occurs during the downshift, failing to establish the interruption criterion until after passage of a time interval which begins at the same time as a change from at least one of the thrust to the traction or from the traction to the thrust.

20. The method according to claim 1, further comprising the step of converting, at a same moment as the interruption criterion is established, all control sequences (A_RS) associated with the downshift from the first gear (i1) to the second gear (i2), shift-specific blocking times and a shift-specific engine action, into corresponding control sequences (A_HS) for an upshift from the second gear (i2) to the first gear (i1).

* * * * *